United States Patent [19]

Muto et al.

[11] Patent Number: 4,480,299
[45] Date of Patent: Oct. 30, 1984

[54] METHOD OF CONTROLLING THE OUTPUT VOLTAGE OF A PULSE WIDTH MODULATION INVERTER

[75] Inventors: Nobuyoshi Muto; Keijiro Sakai; Yasuo Matsuda, all of Hitachi; Kenji Nandoh, Funabashi, all of Japan

[73] Assignee: Hitachi, Ltd., Tokyo, Japan

[21] Appl. No.: 449,667

[22] Filed: Dec. 14, 1982

[30] Foreign Application Priority Data

Dec. 15, 1981 [JP] Japan .................. 56-202996

[51] Int. Cl.³ ........................... H02M 1/12
[52] U.S. Cl. .................... 363/41; 318/802; 318/811
[58] Field of Search .............. 363/35, 37, 41–43, 363/95–98; 318/345 C, 345 G, 807–811, 801–802

[56] References Cited

U.S. PATENT DOCUMENTS

| | | | |
|---|---|---|---|
| 3,611,086 | 10/1971 | Mokrytzki et al. | 363/41 X |
| 3,971,972 | 7/1976 | Stich | 363/41 X |
| 4,047,083 | 9/1977 | Plunkett | 363/41 X |
| 4,367,520 | 1/1983 | Muto et al. | 363/41 |
| 4,419,615 | 12/1983 | Muto et al. | 318/811 |

*Primary Examiner*—Peter S. Wong
*Attorney, Agent, or Firm*—Antonelli, Terry & Wands

[57] ABSTRACT

A pulse width modulation inverter is controlled by the use of the fundamental wave voltage $E_1$ of the inverter output as a feedback quantity, the fundamental wave voltage $E_1$ being obtained as the product of a function $g(K_H)$ which is determined by the amplitude ratio $K_H$ of a carrier wave and a modulated wave, and a d.c. voltage $E_D$ input of the inverter.

6 Claims, 5 Drawing Figures

METHOD OF CONTROLLING THE OUTPUT VOLTAGE OF A PULSE WIDTH MODULATION INVERTER

BACKGROUND OF THE INVENTION

This invention relates to a method of controlling the output voltage (AVR) of a pulse width modulation (PWM) inverter. More particularly, the present invention relates to a method of controlling the output voltage of a PWM inverter which is suitable for accurately controlling an induction motor (IM).

The PWM inverter is driven by a PWM signal (rectangular wave) obtained by comparing the level of a carrier wave with that of a modulated wave and outputs a voltage with the same pulse train as that of the PWM signal. Accordingly, the output voltage is also a rectangular wave and contains not only the fundamental wave component but also a large number of higher harmonic components.

When driving the induction motor at various frequencies using the PWM inverter, control is effected while the ratio of the output voltage to the frequency (E/f) is kept constant. This control system can be divided into a speed control section and a voltage control section. A detailed explanation of the speed control section is not provided herein because it is not relevant to the present invention. The conventional voltage control section has a construction in which the voltage output from the PWM inverter is detected via a power transformer (PT) and the detected value is compared with a set voltage value so as to correct the PWM signal by the difference. In accordance with this method, the detected value itself contains higher harmonic components. However, what determines the torque characteristics of an induction motor is magnetic flux and what generates the magnetic flux is the fundamental component of the output voltage. In this regard, the higher harmonic components are rather detrimental to required control. Accordingly, precision induction motor control cannot be expected if the output voltage of the PWM inverter is controlled by using the detected value, which contains higher harmonic components, as the feedback quantity.

It is therefore conceivable to isolate the fundamental component of the detected output voltage and to use it as the feedback quantity. However, this method is not practical, though theoretically possible, for the following reasons. First of all, the calculations involved in isolation of the fundamental component are so complicated that sufficient speed performance cannot be obtained, even if a high-speed Fourier converter is used. Secondly, torque variations are likely to occur if the fundamental component is isolated by a variable filter or the like. The variations become especially obvious when the inverter frequency changes rapidly. Thirdly, the voltage detecting transformer becomes saturated in the low frequency range, and therefore, output voltage detection becomes impossible in practice using known techniques.

SUMMARY OF THE INVENTION

It is therefore an object of the present invention to provide an output voltage controlling method for a PWM inverter suitable for precision control of an induction motor.

The present invention is based on the fact that the fundamental component $E_1$ of the output voltage is given by the formula:

$$E_1 = g(K_H) \cdot E_D$$

where $K_H$ is the ratio of the amplitude of the modulated wave to the amplitude of the carrier wave (the amplitude ratio), $g(K_H)$ is a function of the ratio $K_H$, and $E_D$ is the d.c. voltage input of the PWM inverter. Accordingly, the gist of the present invention resides in using the value $E_1$ obtained by this formula as the feedback quantity for controlling the output voltage of the PWM inverter, rather than using the value $E_D$ as provided in the prior art. Further, provision of the values of $E_1$ on the basis of applied values of $E_D$ is effected in accordance with the present invention in a way which achieves high-speed performance.

DESCRIPTION OF THE PREFERRED EMBODIMENTS

Assume that a predetermined PWM signal is applied to a switching element of the U phase positive side of the switching elements forming a three-phase PWM inverter (U, V and W phases). The phase voltage $E_U$ has the same peak value as that of the input voltage $E_D$ of the PWM inverter and has a waveform having the same pulse train as that of the given PWM signal. This phase voltage $E_U$ is expressed by the following formula:

$$E_U = \sum_{n=1}^{\infty} E_{2n-1} \sin(2n-1)\omega t \qquad (1)$$

where n is a positive integer and $\omega$ is the angular frequency. The higher harmonic components $E_{2n-1}$ of order $(2n-1)$ can be obtained by developing this phase voltage $E_U$ (or the line voltage $E_{UV}=\sqrt{3}E_U$) into a Fourier series.

This expansion varies with the frequency relationship between the carrier wave and the modulated wave. Accordingly, in the following description, N is the number of carrier waves within a half period of the modulated wave (number of divisions), D is the modulation level of the modulated wave, H is the peak value of the carrier wave and S is the PWM signal.

Figure 1:
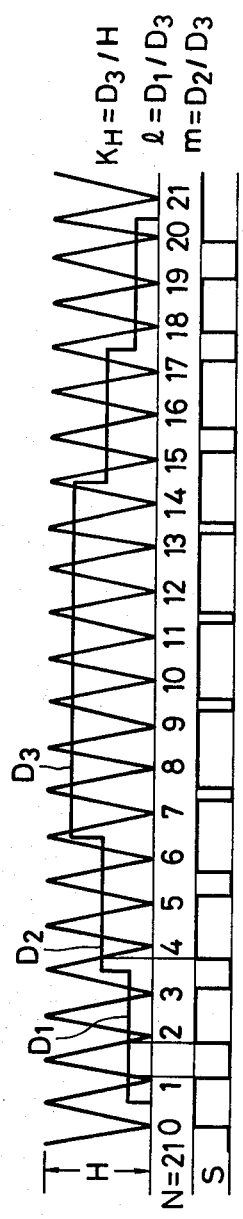
FIGS. 1 through 3 are schematic diagrams which show the methods of forming the pulse width modulation signals when the number of divisions are N=21, 15 and 9, respectively.

FIG. 1 shows three cases in which the number of divisions N is 21 and the modulation levels are $D_1$, $D_2$ and $D_3$. The expansion expressing the higher harmonic component $E_{2n-1}$ is as follows:

$$E_{2n-1} = \frac{2E_D}{(2n-1)\pi}\left[1 - 4\left\{\sin\frac{(2n-1)\pi}{14} \cdot \right.\right. \qquad (2)$$

$$\sin\frac{(2n-1)\pi}{42}(1 - K_H \cdot l) + \sin\frac{(2n-1)\pi}{42}(7 -$$

-continued
$$\frac{1}{2} K_H(m-l)) \cdot \sin \frac{(2n-1)\pi}{42} (1 - \frac{1}{2} K_H(m+l)) +$$

$$\sin \frac{11(2n-1)\pi}{42} \cdot \sin \frac{(2n-1)\pi}{42} (1 - K_H \cdot m) +$$

$$\sin \frac{5(2n-1)\pi}{14} \cdot \sin \frac{(2n-1)\pi}{42} (1 - K_H) +$$

$$\sin \frac{19(2n-1)\pi}{42} \cdot \sin \frac{(2n-1)\pi}{42} (1 - K_H) \Bigg\} \Bigg]$$

where $l = D_1/D_3$, $m = D_2/D_3$, $K_H = D_3/H$.

Figure 2:
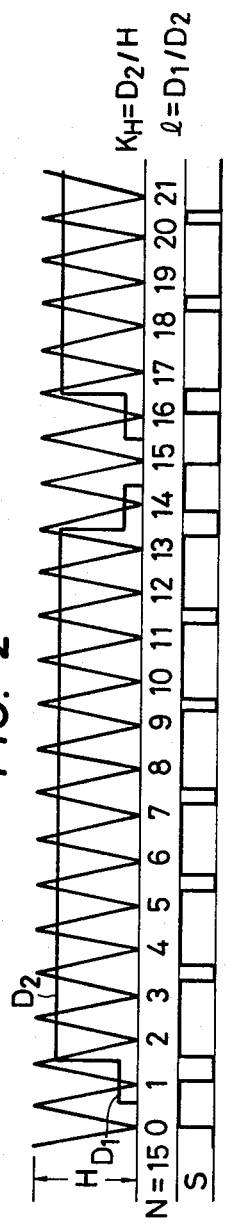

FIG. 2 shows two cases in which the number of divisions N is 15 and the modulation levels are $D_1$ and $D_2$, and $E_{2n-1}$ is given by the following formula:

$$E_{2n-1} = \frac{2E_D}{(2n-1)\pi} \left[ 1 - 4 \left( \sin \frac{(2n-1)\pi}{10} \cdot \right. \right. \tag{3}$$

$$\sin \frac{(2n-1)\pi}{30} (1 - K_H \cdot l) + \sin \frac{(2n-1)\pi}{30} (7 -$$

$$\frac{1}{2} K_H(1-l)) \cdot \sin \frac{(2n-1)\pi}{30} (1 - \frac{1}{2} K_H(1+l)) +$$

$$\sin \frac{11(2n-1)\pi}{30} \cdot \sin \frac{(2n-1)\pi}{30} (1 - K_H) \Bigg\} -$$

$$2 \cos \frac{(2n-1)\pi}{15} (7 + \frac{1}{2} K_H) \Bigg]$$

where $l = D_1/D_2$, $K_H = D_2/H$.

Figure 3:
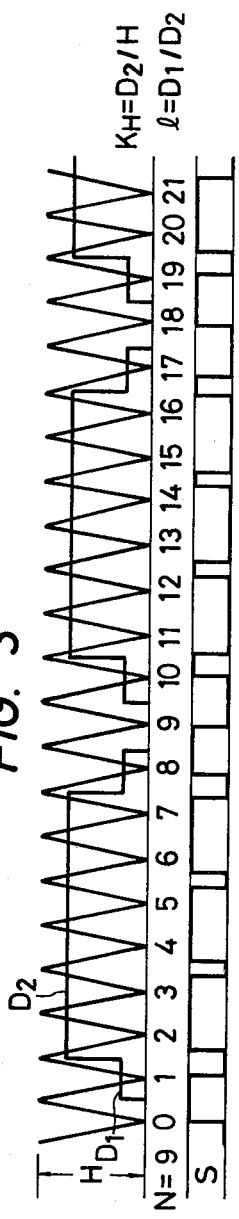

FIG. 3 shows two cases in which the number of divisions N is 9 and the modulation levels are $D_1$ and $D_2$, similarly to FIG. 2, and $E_{2n-1}$ is given by the following formula:

$$E_{2n-1} = \frac{2E_D}{(2n-1)\pi} \left[ 1 - 4 \left( \sin \frac{(2n-1)\pi}{18} (3 - \right. \right. \tag{4}$$

$$\frac{1}{2} K_H(1-l)) \cdot \sin \frac{(2n-1)\pi}{18} (1 - \frac{1}{2} K_H(1+l)) +$$

$$\sin \frac{7(2n-1)\pi}{18} \cdot \sin \frac{(2n-1)\pi}{18} (1 - K_H) \Bigg\} \Bigg]$$

where $l = D_1/D_2$, $K_H = D_2/H$.

The formula for the fundamental wave component $E_1$, i.e., $E_1 = g(K_H) \cdot E_D$, can be solved for each of the examples of FIGS. 1-3 by substituting $n = 1$ into formulas (2) through (4), respectively. This formula can be established not only for the cases of N=21, 15 and 9, but also for all values of N that satisfy the relationship N=3(2p−1), where p is a positive integer.

Though a triangular wave and a step wave are used as the carrier wave and the modulated wave, respectively, in each of FIGS. 1 through 3, it is also possible to use a sawtooth wave as the carrier wave and a sine or trapezoidal wave as the modulated wave.

Figure 4:
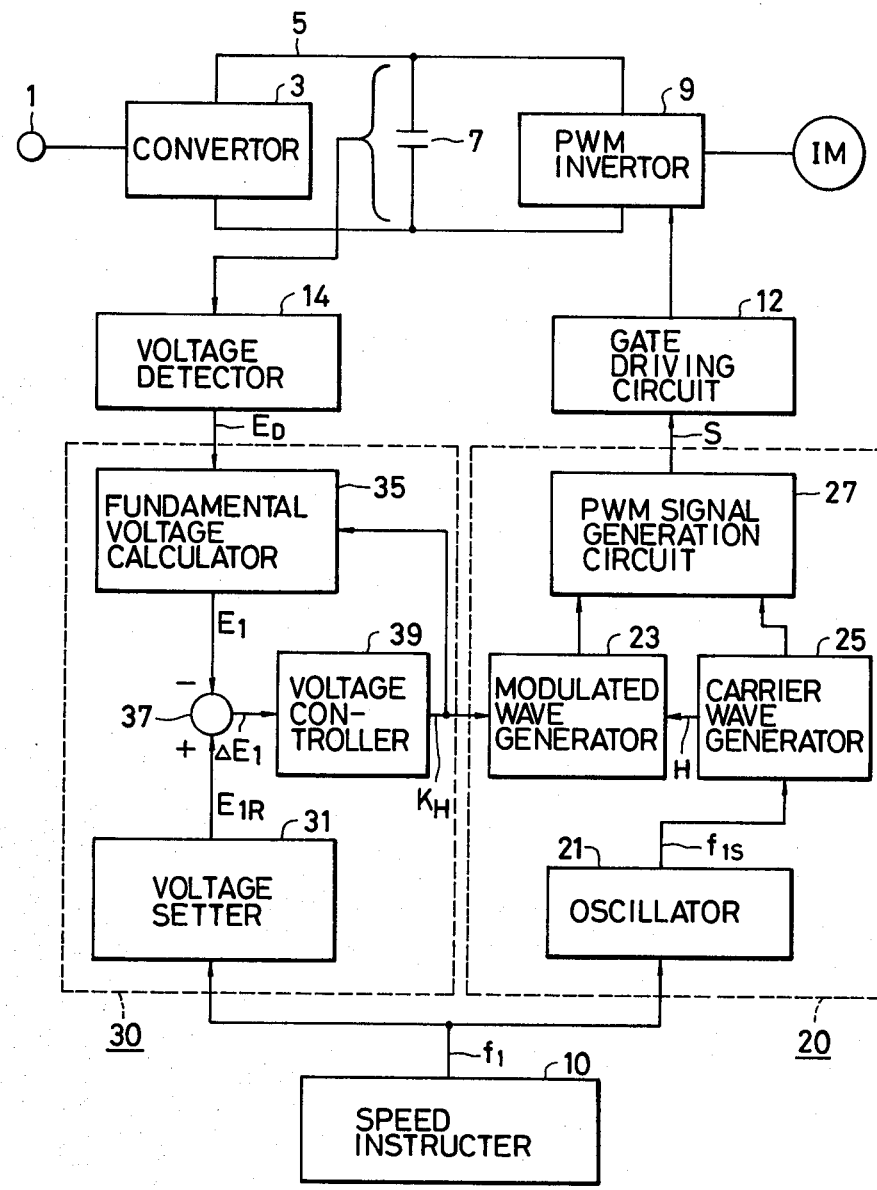
FIG. 4 is a schematic block diagram showing one embodiment of the present invention.

FIG. 4 shows one embodiment of the present invention. A converter 3 receives an alternating current from an a.c. source 1 and supplies a direct current to the d.c. line 5. A smoothing capacitor 7 is connected to the d.c. line 5. A smoothing capacitor 7 is connected to the d.c. line 5. A PWM inverter 9 receives direct current from a d.c. line 5, is controlled by an external signal and produces the required alternating current for the induction motor IM. The PWM inverter 9 is controlled in the following manner.

The control system is divided into a speed control section 20 and a voltage control section 30. An oscillator 21 in the speed control section 20, first outputs a reference signal $f_{1s}$ on the basis of an instruction $f_1$ from a speed instructor 10. A carrier wave generator 25 determines the number of divisions N corresponding to this reference signal $f_{1s}$ and selects a fundamental unit T (μs) for a counter (not shown) for shaping the carrier wave. The peak value H of the carrier wave is obtained in generator 25 from the formula $H = (2NTf_{1s})^{-1} \times 10^{+6}$. Accordingly, the carrier wave generator 25 outputs the triangular wave shown in FIGS. 1 through 3 with frequency $f_{1s}$ and peak value H to a modulated wave generator 23.

The modulated wave generator 23 receives this peak value H and an amplitude ratio $K_H$ output from a voltage controller 39 in the voltage control 30, determines the level of the modulated wave from the relationship $D_3 = K_H \cdot H$, $D_1 = l \cdot D_3$ and $D_2 = m \cdot D_3$ when the number of divisions is N=21, for example, and outputs a modulated step wave such as that shown in FIGS. 1 through 3 to a PWM signal generation circuit 27. The values of l and m are constants which are set internally so as to reduce the higher harmonic components of the PWM signal. The PWM signal generation circuit 27 compares the level of this modulated step wave with that of the triangular wave and generates the PWM signal S shown in FIGS. 1 through 3.

A method of generating this signal S using such a speed control 20 is described in detail in U.S. patent application Ser. No. 319,268, filed Sept. 11, 1981, now U.S. Pat. No. 4,419,615, pages 30–37, the disclosure of which is fully incorporated herein by reference. A gate driving circuit 12 amplifies this signal S and applies it to each of the switching elements (not shown) that make up the PWM inverter 9.

Meanwhile, a voltage setter 31 in the voltage control section 30 receives the speed instruction $f_1$ and produces a fixed voltage $E_{1R}$ satisfying the relationship E/f=constant. A voltage detector 14 detects the d.c. voltage $E_D$ input of the PWM inverter 9, and a fundamental voltage calculator 35 calculates the fundamental wave component $E_1$ of the output voltage on the basis of the formula $E_1 = g(K_H) \cdot E_D$ from this voltage $E_D$ and a function $g(K_H)$ determined by the amplitude ratio $K_H$.

In this instance, the function of $g(K_H)$ may be calculated directly from the above formulas (2) through (4). However, it is more convenient to tabulate the values of a proportional constant $\alpha_N$ for various values of the number of divisions N and to obtain the function $g(K_H)$ from the product of $\alpha_N$ and the amplitude ratio $K_H$, because a relatively-satisfactory approximate expression $g(K_H) \approx \alpha_N \cdot K_H$ ($\alpha_N$: proportional constant) can be established within the practical range. In this way the fundamental voltage calculator simply comprises a pair of multipliers connected in cascade, a first multiplier effecting $\alpha_N \cdot K_H$ and a second multiplier effecting multiplication of $E_D$ by the output of the first multiplier to produce $E_1$ as an output.

A subtracter 37 produces the difference $\Delta E_1$ between the fundamental wave component $E_1$ thus calculated in the fundamental voltage calculator 35 and the set voltage $E_{1R}$ obtained previously from the output of voltage setter 31. At the start of the inverter operation, the voltage controller 39 produces an amplitude ratio $K_H$ corresponding to the set voltage $E_{1R}$ and during the inverter operation, it produces an amplitude ratio $K_H$ which is corrected by the difference $\Delta E_1$ described above. This value of $K_H$ is input to the fundamental wave voltage calculator 35 and to the modulated wave generator 23 in speed control 20 and is subjected to predetermined processing.

The PWM inverter 9 is controlled by the outputs of the speed control section 20 and the voltage control section 30, each having the construction described above. In accordance with this embodiment, precision control of the induction motor IM is possible because the output voltage is controlled by using only the fundamental wave component $E_1$ as a feedback quantity.

Figure 5:
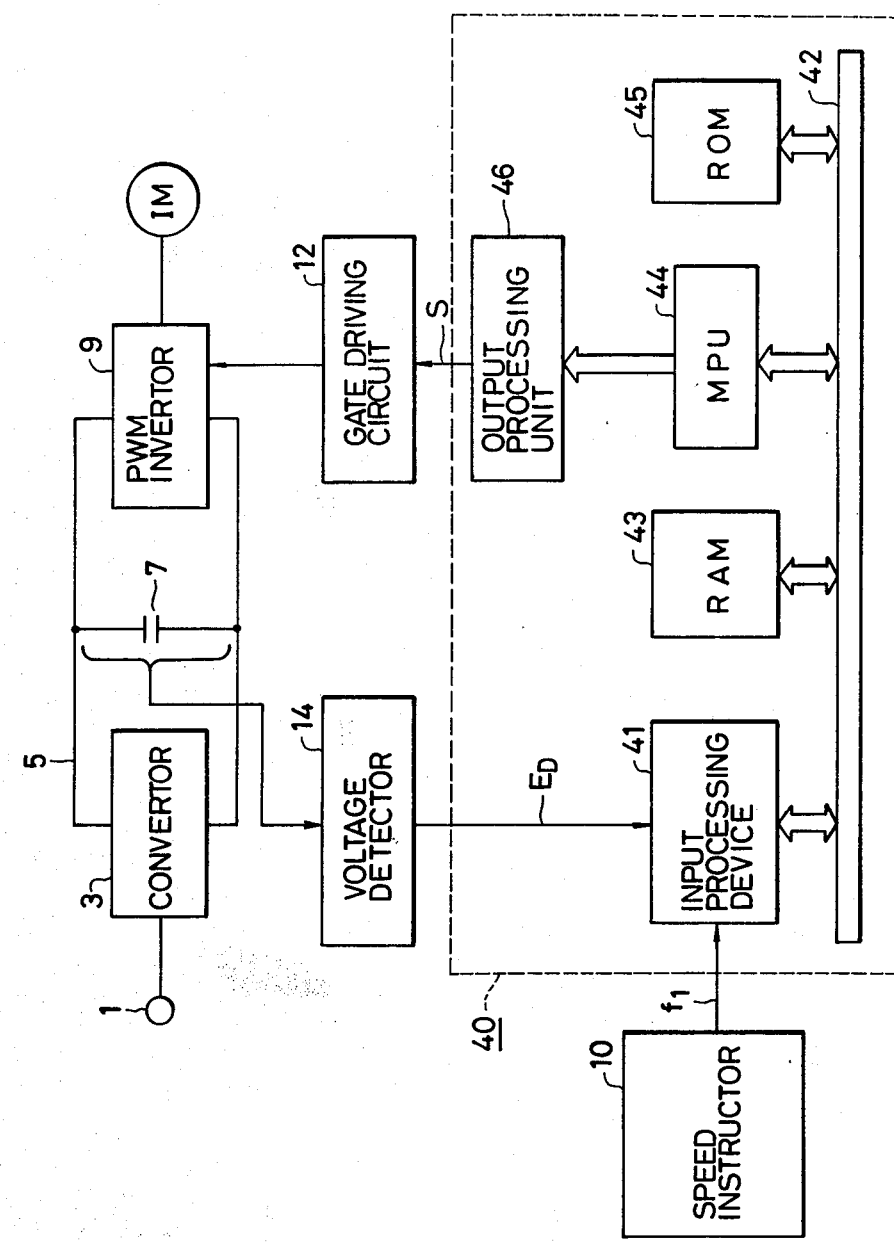
FIG. 5 is a schematic block diagram of another embodiment of the present invention.

FIG. 5 shows another embodiment of the present invention in which a micro-computer 40 composes the principal sections of the embodiment of FIG. 4. All the operating programs for the speed control section 20 and the voltage control section 30 are stored in advance in a read-only memory (ROM) 45 of the micro-computer 40. When the instruction $f_1$ (analog signal) and the d.c. voltage $E_D$ (analog signal) are input from the speed instructor 10 and the voltage detector 14, respectively, an input processing device 41, whose principal component is an A/D converter, converts these analog signals $f_1$ and $E_D$ to digital signals and outputs them. These digital outputs $f_1$, $E_D$ are stored in a random access memory (RAM) 43 via a bus 42. A microprocessor unit (MPU) 44 reads the digital values $f_1$, $E_D$ from the RAM 43, executes the operating programs read out from the ROM 45 using this data and outputs the PWM instruction signal S. An output processing unit 46, which basically comprises a D/A converter, shapes the PWM signal S on the basis of this instruction signal. Thus, control is carried out in the same way as in the embodiment of FIG. 4. In accordance with this embodiment, precision control of the induction motor IM can be effected by the use of an apparatus which has a high reliability and is economical.

As described in the foregoing, the present invention can provide a PWM inverter capable of precision control of an induction motor because only the fundamental wave component of the output voltage $E_1$ is used as the feedback quantity.

What is claimed is:

1. In a method of controlling the output voltage of a pulse width modulation inverter by effecting on-off control of switching elements making up the inverter on the basis of a pulse width modulation signal obtained by comparing the level of a carrier wave with that of a modulated wave, the improvement comprising the following steps: determining the amplitude ratio $K_H$ of said carrier wave and said modulated wave; detecting a d.c. voltage $E_D$ input of said interver; calculating the fundamental wave voltage $E_1$ of said inverter output from the product of a function $g(K_H)$ determined by said amplitude ratio $K_H$ and said d.c. voltage $E_D$; calculating the differential voltage $\Delta E_1$ between said fundamental wave voltage $E_1$ and a fixed value $E_{1R}$; and correcting said amplitude ratio $K_H$ by said differential voltage $\Delta E_1$.

2. The method of controlling the output voltage of a pulse width modulation inverter as defined in claim 1, wherein said function $g(K_H)$ is calculated approximately from the product of a proportional constant $\alpha_N$ and said amplitude ratio $K_H$, said proportional constant $\alpha_N$ being tabulated in accordance with the number N of carrier waves contained in a half period of said modulated wave.

3. A system for controlling the output voltage of a pulse width modulation inverter for control of an induction motor on the basis of a pulse width modulation signal, comprising:

speed control means for generating said pulse width modulation signal on the basis of an applied speed control signal and an amplitude ratio signal $K_H$ by comparing the level of a carrier wave with that of a modulated wave, including carrier wave generator means responsive to said speed control signal for generating said carrier wave, modulated wave generator means responsive to said carrier wave and said amplitude ratio signal for generating said modulated wave, and means for producing said pulse width modulation signal by comparing said carrier wave with said modulated wave; and voltage control means for generating said amplitude ratio signal $K_H$ on the basis of said applied speed control signal and only the fundamental wave component of the output voltage of said pulse width modulation inverter.

4. A system as defined in claim 3, wherein said voltage control means includes fundamental voltage calculator means responsive to the input voltage $E_D$ of said pulse width modulation inverter and said amplitude ratio signal $K_H$ for generating a voltage $E_1$ corresponding to said fundamental wave component, means for generating a voltage $E_{1R}$ on the basis of said speed control signal, means for producing a voltage $\Delta E_1$ representing the difference between the voltage $E_{1R}$ and $E_1$, and means for generating said amplitude ratio signal $K_H$ on the basis of said voltage $\Delta E_1$.

5. A system as defined in claim 4, wherein said fundamental voltage calculator means includes means for producing said voltage $E_1$ from the product of a function $g(K_H)$ determined by said amplitude ratio signal $K_H$ and the input voltage $E_D$.

6. A system as defined in claim 5, wherein said fundamental voltage calculator means further includes means for producing a proportional constant $\alpha_N$ whose value is based on the number N of carrier waves contained in a half period of said modulated wave and means for producing said function $g(K_H)$ from the product of said proportional constant $\alpha_N$ and said amplitude ratio $K_H$.

* * * * *